United States Patent
Mase et al.

(10) Patent No.: US 11,487,972 B2
(45) Date of Patent: Nov. 1, 2022

(54) REWARD FUNCTION GENERATION METHOD AND COMPUTER SYSTEM

(71) Applicant: HITACHI, LTD., Tokyo (JP)

(72) Inventors: Masayoshi Mase, Tokyo (JP); Yaemi Teramoto, Tokyo (JP); Toshihiro Kujirai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 650 days.

(21) Appl. No.: 16/545,165

(22) Filed: Aug. 20, 2019

(65) Prior Publication Data

US 2020/0074236 A1     Mar. 5, 2020

(30) Foreign Application Priority Data

Aug. 31, 2018   (JP) .............................. JP2018-163057

(51) Int. Cl.
    *G06K 9/62*        (2022.01)
    *G06N 20/00*     (2019.01)

(52) U.S. Cl.
    CPC ........... *G06K 9/6262* (2013.01); *G06K 9/626* (2013.01); *G06K 9/6257* (2013.01); *G06N 20/00* (2019.01)

(58) Field of Classification Search
    CPC .... G06K 9/6262; G06K 9/6257; G06K 9/626; G06N 20/00; G06N 3/006
    See application file for complete search history.

(56) References Cited

U.S. PATENT DOCUMENTS

| | | | |
|---|---|---|---|
| 8,756,177 | B1 | 6/2014 | Margineantu et al. |
| 2018/0165603 | A1* | 6/2018 | Van Seijen .......... G06N 3/0454 |
| 2018/0374138 | A1* | 12/2018 | Mohamed ................ G06N 5/04 |

FOREIGN PATENT DOCUMENTS

| | | | | |
|---|---|---|---|---|
| JP | 2016-118975 | A | | 6/2016 |
| JP | 6538766 | B2 | * | 7/2019 .............. G05B 1/00 |
| WO | WO-2018212918 | A1 | * | 11/2018 ............. G06N 20/00 |

OTHER PUBLICATIONS

Extended European Search Report, dated Jan. 22, 2020, which issued during the prosecution of European Application No. 19192913.2, which corresponds to the present application.

* cited by examiner

*Primary Examiner* — Carol Wang
(74) *Attorney, Agent, or Firm* — Baker Botts L.L.P.

(57) ABSTRACT

Provided is a reward function generation method for calculating a reward in reinforcement learning, the method being executed by a computer, and the method includes accepting input of an instruction to generate a reward function including a plurality of setting data that is information regarding a key performance indicator, generating one partial reward function for one of the setting data, generating a linear combination of a plurality of the partial reward functions as the reward function, and outputting information regarding the reward function generated to the computer that executes the reinforcement learning, by the computer.

12 Claims, 11 Drawing Sheets

FIG. 5

| ID 501 | KPI NAME 502 | CONDITION 503 | PURPOSE 504 | CONTROL VALUE 505 | DEGREE OF PRIORITY 506 | CORRECTION METHOD 507 | FUNCTION 508 | WEIGHT 509 |
|---|---|---|---|---|---|---|---|---|
| 1 | x_error | Goal | CONSTRAINT | hard[0,0.1] | 1 | 1 | $r_1 = \begin{cases} 10^6 \text{ (if true)} \\ 0 \text{ (if false)} \end{cases}$ | W1 |
| 2 | ampl | Goal | CONSTRAINT | [0,0.1] | 2 | 1 | $r_2 = \begin{cases} 10^5 \text{ (if true)} \\ 0 \text{ (if false)} \end{cases}$ | W2 |
| 3 | time | Goal | min | - | 3 | 1 | $r_3 = 10^4 \times \{max(t) - t\}$ | W3 |
| 4 | x_error | Goal | min | - | 4 | 1 | $r_4 = 10^4 \times \{max(x) - x\}$ | W4 |
| 5 | ampl | Goal | min | - | 5 | 1 | $r_5 = \ldots$ | W5 |
| 6 | num_operation | Step | min | - | 6 | 3 | $r_6 = \ldots$ | W6 |

| CONDITION 601 | PURPOSE 602 | FUNCTION TYPE 603 | PENALTY FUNCTION TYPE 604 | 216 |
|---|---|---|---|---|
| Goal | max | MONOTONICALLY INCREASING FUNCTION OF VARIABLE | DISTANCE FUNCTION OF VARIABLE | |
| Goal | min | MONOTONICALLY DECREASING FUNCTION OF VARIABLE | DISTANCE FUNCTION OF VARIABLE | |
| Goal | CONSTRAINT | WHEN CONDITION IS SATISFIED: CONSTANT OTHER THAN THAT: 0 | CONSTANT | |
| Step | max | MONOTONICALLY INCREASING FUNCTION OF VARIABLE | - | |
| Step | min | MONOTONICALLY DECREASING FUNCTION OF VARIABLE | - | |
| Step | CONSTRAINT | WHEN CONDITION IS SATISFIED: CONSTANT OTHER THAN THAT: 0 | - | |
| ... | ... | ... | ... | |

FIG. 7

| KPI NAME 701 | CONDITION 702 | PURPOSE 703 | CONTROL VALUE 704 | EVALUATION 705 | DEGREE OF CONTRIBUTION 706 |
|---|---|---|---|---|---|
| x_error | Goal | CONSTRAINT | hard[0,0.1] | true | 40 |
| ampl | Goal | CONSTRAINT | [0,0.1] | false | 28 |
| time | Goal | min | - | - | 18 |
| x_error | Goal | min | - | - | 5 |
| ampl | Goal | min | - | - | 7 |
| num_operation | Step | min | - | - | 2 |

REWARD FUNCTION GENERATION METHOD AND COMPUTER SYSTEM

CLAIM OF PRIORITY

The present application claims priority from Japanese patent application JP 2018-163057 filed on Aug. 31, 2018, the content of which is hereby incorporated by reference into this application.

BACKGROUND OF THE INVENTION

1. Field of the Invention

The present invention relates to a reward function generation method used in reinforcement learning.

2. Description of the Related Art

In recent years, reinforcement learning has been utilized in various industries. To perform the reinforcement learning, it is necessary to construct a model corresponding to a problem to be learned and set various parameters. In the reinforcement learning, learning of an optimal measure is performed so that a key performance indicator (KPI) meets a predetermined purpose. For example, a technology is known described in JP 2016-118975 A.

In JP 2016-118975 A, a marketing measure optimization device is disclosed including: "a KPI selection unit that selects a KPI that is a quantitative evaluation indicator of a marketing measure; a target value setting unit that sets a target value of the KPI; a measure reaction rate calculation unit that calculates a predicted value of the KPI that is a measure reaction rate of the marketing measure, with reference to a marketing measure case carried out in the past, using a coefficient related to a basic attribute of a customer included in a customer profile database; and an optimal measure recommendation unit that recommends to carry out the marketing measure when the predicted value exceeds the target value".

SUMMARY OF THE INVENTION

In model design work for implementing reinforcement learning, it is necessary to design a reward model (reward function) in consideration of s control purpose of each of a plurality of KPIs. It is very difficult to design such a reward model, and at present, a user designs the reward by trial and error. There is therefore a need to reduce a burden of construction work of the model, particularly a burden of reward design.

It is an object of the present invention to provide a method and system for achieving reduction of the burden of reward design.

The following is a representative example of the invention disclosed in the present application. That is, a reward function generation method for calculating a reward in reinforcement learning, the method being executed by a computer, the computer including a processor, a memory connected to the processor, and a network interface connected to the processor, the reward function generation method including: a first step of accepting input of an instruction to generate a reward function including a plurality of setting data that is information regarding a key performance indicator, by the processor; a second step of generating one partial reward function for one of the setting data and storing the partial reward function in the memory, by the processor; a third step of generating a linear combination of a plurality of the partial reward functions as the reward function and storing the linear combination in the memory, by the processor; and a fourth step of outputting information regarding the reward function generated to a computer that executes the reinforcement learning, by the processor.

According to the present invention, the burden of reward design can be reduced. Problems, configurations, and effects other than those described above will be clarified from description of embodiments below.

BRIEF DESCRIPTION OF THE DRAWINGS

FIG. 5 is a diagram illustrating an example of a data structure of reward function management information of the first embodiment;

FIG. 6 is a diagram illustrating an example of a data structure of function definition information of the first embodiment;

FIG. 7 is a diagram illustrating an example of a data structure of reinforcement learning evaluation information of the first embodiment;

DESCRIPTION OF THE PREFERRED EMBODIMENTS

Figure 1:
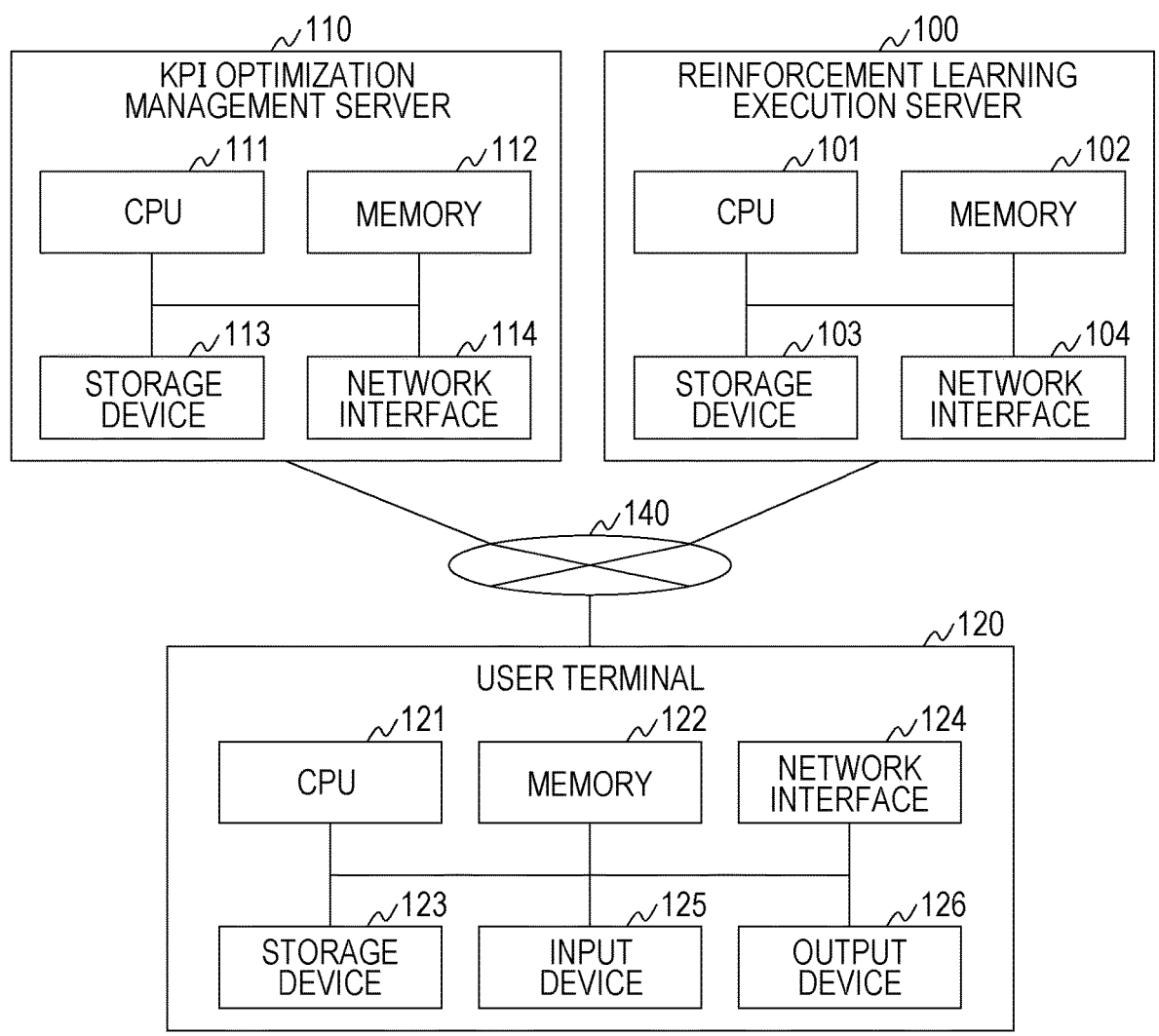
FIG. 1 is a diagram illustrating a hardware configuration of a computer system of a first embodiment.

Hereinafter, embodiments of the present invention will be described with reference to the drawings. However, the present invention should not be construed as being limited to the description of the embodiments described below. Those skilled in the art can easily understand that the specific configuration can be modified without departing from the idea or gist of the present invention.

In the configuration of the invention described below, the same or similar components or functions are denoted by the same reference numerals, and redundant description will be omitted.

In the present description and the like, the notations "first", "second", "third" and the like are used to identify the constituent elements, and the number or order is not necessarily limited.

The positions, sizes, shapes, ranges, and the like of the components illustrated in the drawings and the like are not represent actual positions, sizes, shapes, ranges, and the like, in some cases, to facilitate understanding of the invention.

The present invention is therefore not limited to the position, size, shape, range, and the like disclosed in the drawings and the like.

In the present description, "reward function" represents a reward model, and "reward" represents a value calculated by using the reward function.

First Embodiment

FIG. 1 is a diagram illustrating a hardware configuration of a computer system of a first embodiment.

The computer system illustrated in FIG. 1 includes a reinforcement learning execution server 100, a KPI optimization management server 110, and a user terminal 120. The devices are connected to each other via a network 140. Note that, the type of the network 140 may be a wide area network (WAN), a local area network (LAN), or the like. In addition, the connection method of the network 140 may be wired or wireless.

The reinforcement learning execution server 100 executes reinforcement learning in accordance with a model. In the reinforcement learning, learning processing is repeatedly executed that executes interaction between an agent and an environment multiple times until a predetermined end condition is satisfied. In the present description, a unit of the number of interactions between the agent and the environment in one time of the learning processing is defined as a step, and a unit of the number of times of the learning processing in the reinforcement learning is defined as an episode.

The reinforcement learning execution server 100 includes a CPU 101, a memory 102, a storage device 103, and a network interface 104, as hardware. The hardware components are connected to each other via an internal bus or the like.

The CPU 101 executes a program stored in the memory 102. The CPU 101 executes processing in accordance with a program to operate as a functional unit (module) having a predetermined function. In the following description, when processing is described with a functional unit as a subject, it represents that the CPU 101 executes a program that implements the functional unit.

The memory 102 stores a program executed by the CPU 101 and information necessary for the program. In addition, the memory 102 includes a work area temporarily used by the program.

The storage device 103 stores data permanently. The storage device 103 may be a storage medium such as a hard disk drive (HDD) or a solid state drive (SSD), a non-volatile memory, or the like. Note that, programs and information stored in the memory 102 may be stored in the storage device 103. In that case, the CPU 101 reads the program and information from the storage device 103, loads the program and information into the memory 102, and executes the program loaded into the memory 102.

The network interface 104 connects to other devices via a network.

The KPI optimization management server 110 automatically generates a reward function to be included in the model on the basis of information regarding a KPI. In addition, the KPI optimization management server 110 corrects the reward function on the basis of a result of the reinforcement learning. The KPI optimization management server 110 includes a CPU 111, a memory 112, a storage device 113, and a network interface 114, as hardware. The hardware components are connected to each other via an internal bus or the like.

The CPU 111, the memory 112, the storage device 113, and the network interface 114 are hardware components similar to the CPU 101, the memory 102, the storage device 103, and the network interface 104.

The information regarding the KPI includes definition information on the KPI and the information regarding a control purpose of the KPI in the reinforcement learning. There are two types of the control purpose of the KPI in the reinforcement learning, "constraint" and "target". "Constraint" indicates a condition to be satisfied by the KPI, such as a range of the KPI. "Target" indicates an operation target or the like of the KPI. Examples of the operation target include, for example, minimization of the KPI and maximization of the KPI.

The user terminal 120 is a terminal used by a user. In the first embodiment, the user uses the user terminal 120 to input information regarding the KPI and parameters of the reinforcement learning model, or the like. The user terminal 120 includes a CPU 121, a memory 122, a storage device 123, a network interface 124, an input device 125, and an output device 126, as hardware. The hardware components are connected to each other via an internal bus or the like.

The CPU 121, the memory 122, the storage device 123, and the network interface 124 are hardware components similar to the CPU 101, the memory 102, the storage device 103, and the network interface 104.

The input device 125 is a device for inputting data and the like, and includes a keyboard, a mouse, a touch panel, and the like. The output device 126 is a device for outputting data and the like, and includes a display, a touch panel, and the like.

In the first embodiment, tasks of execution of the reinforcement learning and generation of the reward function are executed by separate computers; however, one computer may execute two tasks. For example, the reinforcement learning execution server 100 and the KPI optimization management server 110 may be implemented as a virtual computer operating on one computer.

Figure 2:
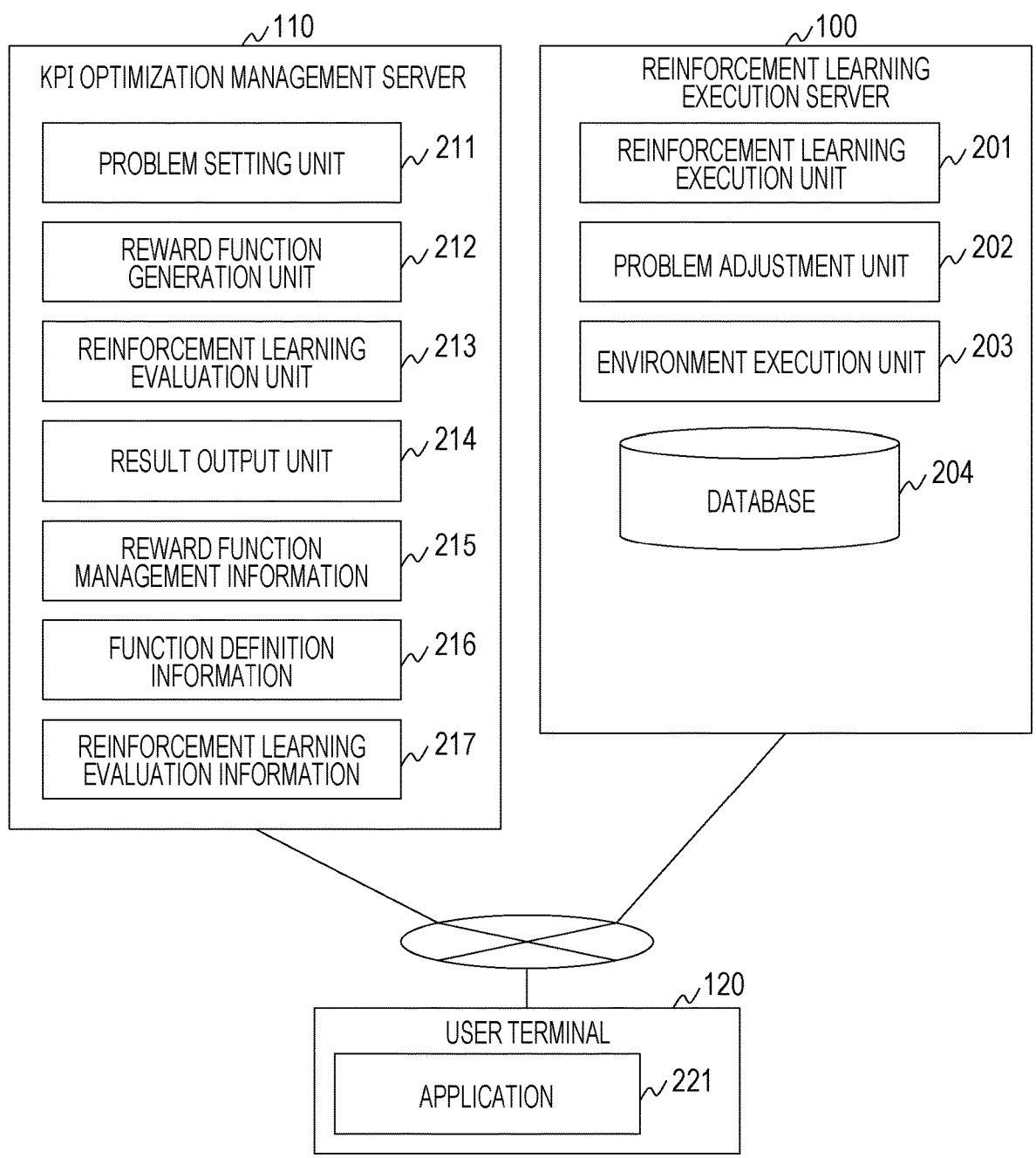
FIG. 2 is a diagram illustrating a software configuration of the computer system of the first embodiment.

FIG. 2 is a diagram illustrating a software configuration of the computer system of the first embodiment.

The reinforcement learning execution server 100 stores programs that implement a reinforcement learning execution unit 201, a problem adjustment unit 202, and an environment execution unit 203, and also holds a database 204.

The reinforcement learning execution unit 201 functions as the agent in the reinforcement learning. The reinforcement learning execution unit 201 acquires information such as a value of the reward and a state of the environment output from the environment (the environment execution unit 203), and selects an action on the basis of the acquired information and a measure. In addition, the reinforcement learning execution unit 201 outputs information regarding the selected action to the environment execution unit 203.

The environment execution unit 203 functions as the environment in the reinforcement learning. The environment execution unit 203 acquires information regarding the action output from the reinforcement learning execution unit 201, and executes simulation of state transition on the basis of the acquired information and a current state of the environment. In addition, the environment execution unit 203 outputs information indicating a state of the environment after the transition as a result of the simulation to the reinforcement learning execution unit 201.

The problem adjustment unit 202 controls input/output between the reinforcement learning execution unit 201 and the environment execution unit 203. The problem adjustment unit 202 manages the reward function instead of the environment execution unit 203, and calculates the reward on the basis of the information output by the environment execution unit 203 and the reward function.

In the first embodiment, the reward function is updated on the basis of the result of the reinforcement learning. Along with this, the information input and output changes in the interaction between the agent and the environment. The problem adjustment unit 202 therefore adjusts the input/output in the interaction between the agent and the environment.

The database 204 stores the result of the reinforcement learning. Details of information stored in the database 204 will be described with reference to FIG. 8.

Note that, regarding functional units included in the reinforcement learning execution server 100, a plurality of functional units may be put together into one functional unit, or one functional unit may be divided into a plurality of functional units for each function. For example, the reinforcement learning execution unit 201, the problem adjustment unit 202, and the environment execution unit 203 may be put together as a learning unit.

The KPI optimization management server 110 stores programs that implement a problem setting unit 211, a reward function generation unit 212, a reinforcement learning evaluation unit 213, and a result output unit 214, and also holds reward function management information 215, function definition information 216, and reinforcement learning evaluation information 217.

The reward function management information 215 is information for managing various types of information for generating the reward function. Details of the reward function management information 215 will be described with reference to FIG. 5.

The function definition information 216 is information for managing a definition of a function for generating a partial reward function constituting the reward function. Details of the function definition information 216 will be described with reference to FIG. 6.

The reinforcement learning evaluation information 217 is information for managing an evaluation result of the reinforcement learning. Details of the reinforcement learning evaluation information 217 will be described with reference to FIG. 7.

The problem setting unit 211 provides an interface for inputting information regarding the KPI and parameters of the reinforcement learning model, or the like. The problem setting unit 211 generates environment execution definition information 301, state/action definition information 302, and reinforcement learning definition information 303 on the basis of the information input via the interface. In addition, the problem setting unit 211 generates the reward function management information 215 on the basis of the information input via the interface.

The reward function generation unit 212 generates a reward function on the basis of the reward function management information 215, and generates information regarding the reward function as reward function definition information 304. The reward function of the first embodiment is defined as a linear combination of a plurality of the partial reward functions (reward terms) as indicated in formula (1).

[Formula 1]
$$R(s, a) = \sum_{j} \alpha_j \cdot r_j(KPI, s, a) \quad (1)$$

Here, R(s, a) is a reward function for calculating a reward given when an action a is performed in a state s. A function related to the KPI is represented by r, and α is a weight. The function r multiplied by the weight α corresponds to one partial reward function. In addition, j is a subscript.

The reinforcement learning evaluation unit 213 evaluates the result of the reinforcement learning, and generates the reinforcement learning evaluation information 217 on the basis of the evaluation result.

The result output unit 214 outputs, to the user terminal 120, information for presenting the evaluation result and a processing result of the reinforcement learning, and the like.

Note that, regarding functional units included in the KPI optimization management server 110, a plurality of functional units may be put together into one functional unit, or one functional unit may be divided into a plurality of functional units for each function. For example, a function of the reward function generation unit 212 may be included in the problem setting unit 211.

The user terminal 120 stores a program that implements an application 221 for operating the interface provided by the KPI optimization management server 110.

Figure 3:
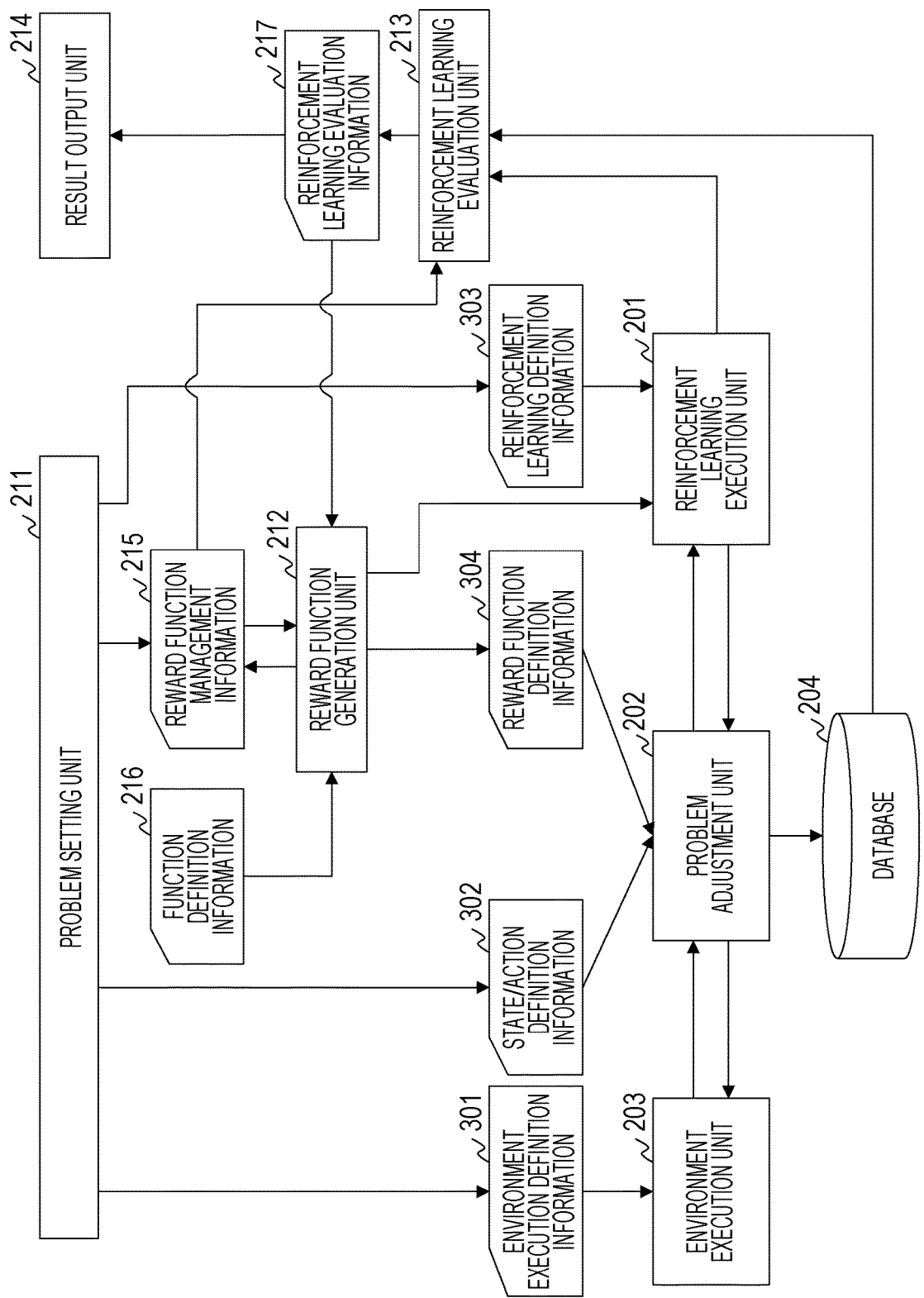
FIG. 3 is a diagram illustrating an example of operation between software components in the computer system of the first embodiment.
Figure 4:
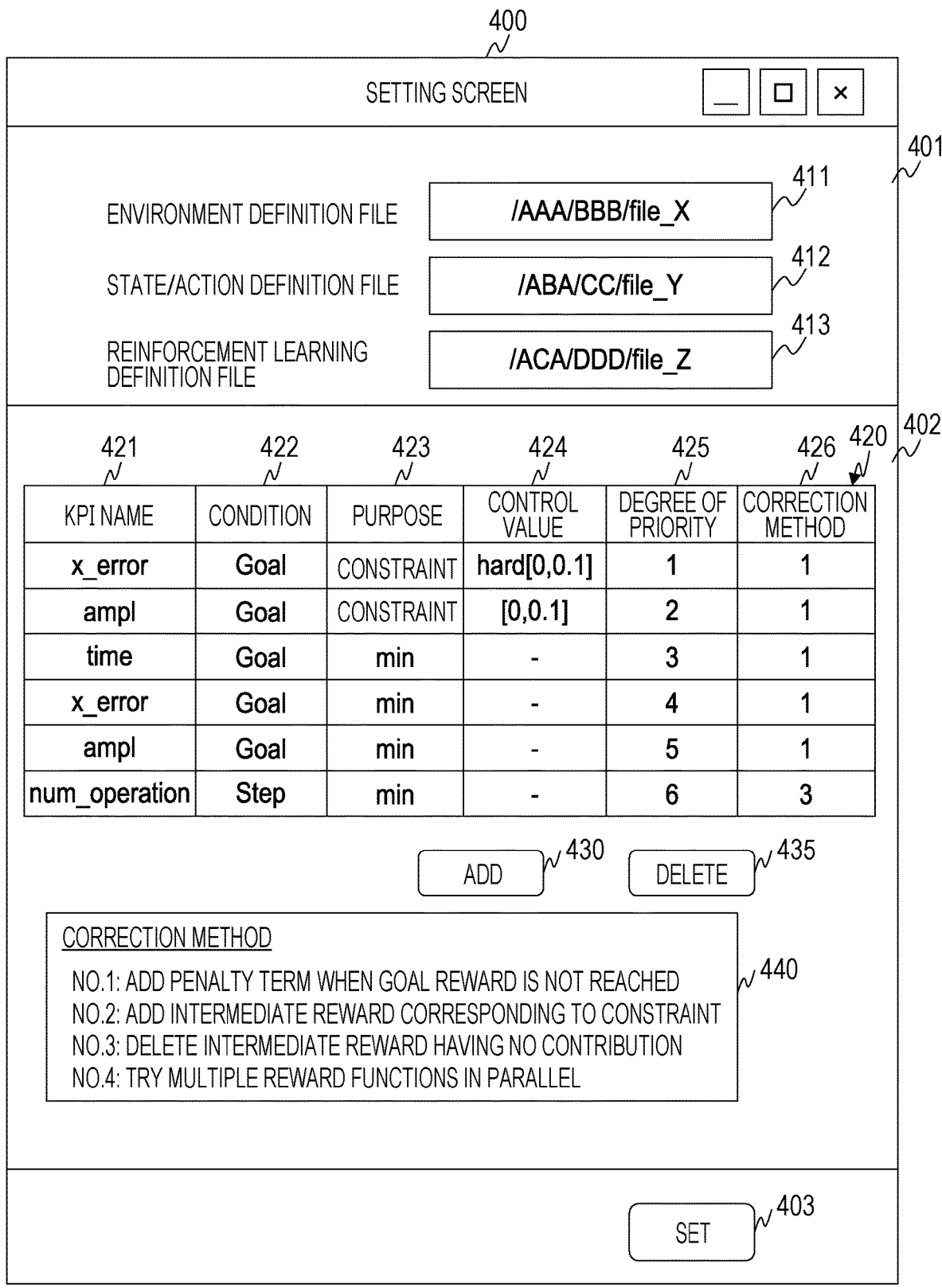
FIG. 4 is a diagram illustrating an example of an interface provided by a KPI optimization management server of the first embodiment.

FIG. 3 is a diagram illustrating an example of operation between software components in the computer system of the first embodiment. FIG. 4 is a diagram illustrating an example of the interface provided by the KPI optimization management server 110 of the first embodiment.

When accepting an operation request from the application 221 of the user terminal 120, the KPI optimization management server 110 calls the problem setting unit 211. The problem setting unit 211 presents a GUI 400 as illustrated in FIG. 4 to the user terminal 120 as the interface. Here, the GUI 400 will be described.

The GUI 400 is the interface provided by the KPI optimization management server 110, and is displayed on the output device 126. The GUI 400 includes a model information input field 401, a reward information input field 402, and a set button 403.

The model information input field 401 is a field for setting information regarding the environment, the state of the environment, the agent's action, the learning processing, and the like. The model information input field 401 includes input fields 411, 412, and 413.

The input field 411 is a field to which information that defines the environment is input. The information set in the input field 411 is input as the environment execution definition information 301. In the present embodiment, the environment execution definition information 301 is assumed to include the definition information on the KPI. Note that, the definition information on the KPI may be input as individual information. The input field 412 is a field to which information that defines the state and the action is input. The information set in the input field 412 is input as the state/action definition information 302. The input field 413 is a field to which information that defines a learning method is input. The information set in the input field 413 is input as the reinforcement learning definition information 303. For example, a path of a setting file is set in each of the input fields 411, 412, and 413.

The reward information input field 402 is a field for setting information necessary for generation of the reward function and correction of the reward function. The reward information input field 402 includes a reward management table 420, an add button 430, a delete button 435, and a description field 440.

The reward management table 420 includes a plurality of entries for storing information regarding the KPI. The entries each include a KPI name 421, a condition 422, a purpose 423, a control value 424, a degree of priority 425, and a correction method 426. As described later, one partial reward function is generated for one entry. In the following description, one entry is also referred to as setting data.

The KPI name 421 is a field that stores identification information of the KPI. In the KPI name 421, for example, a character string is stored representing the name or type of the KPI.

The condition 422 is a field that stores a value indicating the timing of giving a reward regarding the KPI corresponding to the KPI name 421, that is, the timing of calculating the reward. The condition 422 stores "Goal" representing that the reward is given at the end of one episode, "Step" representing that the reward is given at the end of one step, and the like.

The purpose 423 is a field that stores information indicating the type of the control purpose of the KPI. The purpose 423 stores either "constraint" or a value indicating a target. As the value indicating the target, there are "max" indicating maximization of the KPI and "min" indicating minimization of the KPI.

The control value 424 is a field that stores information regarding the range of the KPI set as the constraint. "Hard" indicates that the constraint has to be satisfied.

The degree of priority 425 is a field that stores a value indicating the order of priority of the control purpose of the KPI. In the present embodiment, "1" is assumed to represent that the order of priority is the highest. That is, it is represented that the order of priority is higher as the numerical value is closer to "1".

The correction method 426 is a field for specifying a correction method of the partial reward function. For example, in an environment after the reinforcement learning is executed, the partial reward function is corrected when the constraint is not satisfied or when the target cannot be achieved. In the correction method 426, an identification number indicated in the description field 440 is stored.

The add button 430 is an operation button for adding an entry to the reward management table 420. When the user operates the add button 430, an entry is added to the reward management table 420. The user sets a necessary value for the added entry. Note that, the user can correct the value set in the entry at any timing.

The delete button 435 is an operation button for deleting an entry from the reward management table 420. When the user selects an entry in the reward management table 420 and operates the delete button 435, the entry is deleted from the reward management table 420.

The description field 440 is a field indicating the identification number of the correction method and details of the correction method.

The set button 403 is an operation button for transmitting information input to the GUI 400 to the KPI optimization management server 110.

Description will be continued referring back to FIG. 3.

The problem setting unit 211 accepts various types of information input via the GUI 400. The problem setting unit 211 stores, in the memory 112, the reward management table 420 of the reward information input field 402 as the reward function management information 215. The problem setting unit 211 transmits, to the reinforcement learning execution server 100, the environment execution definition information 301, the state/action definition information 302, and the reinforcement learning definition information 303 input via the GUI 400. In addition, the problem setting unit 211 transmits, to the reward function generation unit 212, an instruction to generate the reward function including the reward function management information 215. At this time, the problem setting unit 211 also transmits the definition information on the KPI included in the environment execution definition information 301 and the like.

The environment execution definition information 301 includes information regarding the type of parameters of the environment, a range of a value that can be taken by each parameter, and the like, and the reinforcement learning definition information 303 includes information regarding the type of the action and the like.

The reward function generation unit 212 generates a reward function on the basis of the reward function management information 215 and the function definition information 216, and transmits the reward function as the reward function definition information 304 to the reinforcement learning execution server 100.

The reinforcement learning execution server 100 generates the environment execution unit 203 on the basis of the environment execution definition information 301, and generates the reinforcement learning execution unit 201 on the basis of the reinforcement learning definition information 303. In addition, the reinforcement learning execution server 100 generates the problem adjustment unit 202 on the basis of the state/action definition information 302 and the reward function definition information 304.

The reward function generation unit 212 outputs a control signal instructing the reinforcement learning execution unit 201 to execute processing. The reinforcement learning execution server 100 starts the reinforcement learning in response to reception of the control signal.

The problem adjustment unit 202 stores, in the database 204, details of interaction of each step in one episode, the KPI, and the reward.

When the reinforcement learning is ended, the reinforcement learning execution unit 201 notifies the reinforcement learning evaluation unit 213 of the end of the processing. When receiving the notification, the reinforcement learning evaluation unit 213 acquires a learning result from the database 204, and executes evaluation processing of the reinforcement learning. The reinforcement learning evaluation unit 213 generates a result of the evaluation processing as the reinforcement learning evaluation information 217, and outputs the result to the reward function generation unit 212 and the result output unit 214.

The result output unit 214 presents a GUI indicating the evaluation result to the user terminal 120. The reward function generation unit 212 identifies a partial reward function that needs to be corrected on the basis of the reinforcement learning evaluation information 217, and corrects the identified partial reward function on the basis of the correction method set in the correction method 426. The reward function generation unit 212 updates the reward function management information 215 on the basis of correction details.

As described above, the system of the first embodiment automatically generates the reward function on the basis of the information regarding the KPI. In addition, the system corrects the reward function on the basis of the evaluation result of the reinforcement learning using the generated reward function. The reward function is corrected on the basis of the evaluation result of the reinforcement learning, whereby a reward function can be presented suitable for a target problem. In addition, the reinforcement learning using the reward function is executed, whereby a more optimal measure can be obtained.

FIG. 5 is a diagram illustrating an example of a data structure of the reward function management information 215 of the first embodiment.

The reward function management information 215 includes a plurality of entries each including an ID 501, a KPI name 502, a condition 503, a purpose 504, a control value 505, a degree of priority 506, a correction method 507, a function 508, and a weight 509. One entry corresponds to one partial reward function.

The KPI name 502, the condition 503, the purpose 504, the control value 505, the degree of priority 506, and the correction method 507 are the same fields as the KPI name 421, the condition 422, the purpose 423, the control value 424, the degree of priority 425, and the correction method 426.

The ID 501 is a field that stores identification information for uniquely identifying an entry. The function 508 is a field that stores the function r. The weight 509 is a field that stores a value of the weight $\alpha$.

Here, processing will be described of generating the reward function management information 215 from the reward management table 420.

(Processing 1) The problem setting unit 211 initializes the reward function management information 215.

(Processing 2) The problem setting unit 211 selects one entry from the reward management table 420, and adds one entry to the reward function management information 215. The problem setting unit 211 sets an identification number in the ID 501 of the added entry. The identification numbers are set in ascending order. The problem setting unit 211 sets values of the KPI name 421, the condition 422, the purpose 423, the control value 424, the degree of priority 425, and the correction method 426 of the selected entry respectively for the KPI name 502, the condition 503, the purpose 504, the control value 505, the degree of priority 506, and the correction method 507 of the added entry.

The problem setting unit 211 repeatedly executes (Processing 2) on all the entries of the reward management table 420. The reward function management information 215 is generated by the above processing. Note that, at this point, the function 508 and the weight 509 are blanks.

FIG. 6 is a diagram illustrating an example of a data structure of the function definition information 216 of the first embodiment.

The function definition information 216 includes a plurality of entries each including a condition 601, a purpose 602, a function type 603, and a penalty function type 604. One entry corresponds to definition information on one function.

The condition 601 and the purpose 602 are the same fields as the condition 422 and the purpose 423.

The function type 603 is a field that stores information indicating a type of a function defined for a combination of the condition 601 and the purpose 602. The penalty function type 604 is a field that stores information indicating a type of a penalty function for inducing the KPI so that the target is satisfied. Note that, a specific function is generated on the basis of parameters related to the KPI.

FIG. 7 is a diagram illustrating an example of a data structure of the reinforcement learning evaluation information 217 of the first embodiment.

The reinforcement learning evaluation information 217 includes a plurality of evaluation tables 700 each indicating evaluation results on a one episode basis in the reinforcement learning. The order of the episode is given to the evaluation table 700.

The evaluation table 700 includes a plurality of entries each including a KPI name 701, a condition 702, a purpose 703, a control value 704, an evaluation 705, and a degree of contribution 706. The evaluation table 700 includes the same number of entries as the setting data.

The KPI name 701, the condition 702, the purpose 703, and the control value 704 are the same fields as the KPI name 421, the condition 422, the purpose 423, and the control value 424.

The evaluation 705 is a field that stores a value indicating whether the constraint is satisfied. The evaluation 705 of an entry not related to the constraint is a blank. The degree of contribution 706 is a field that stores a numerical value indicating the magnitude of contribution of a value of the partial reward function to the selection of the action.

Figure 8:
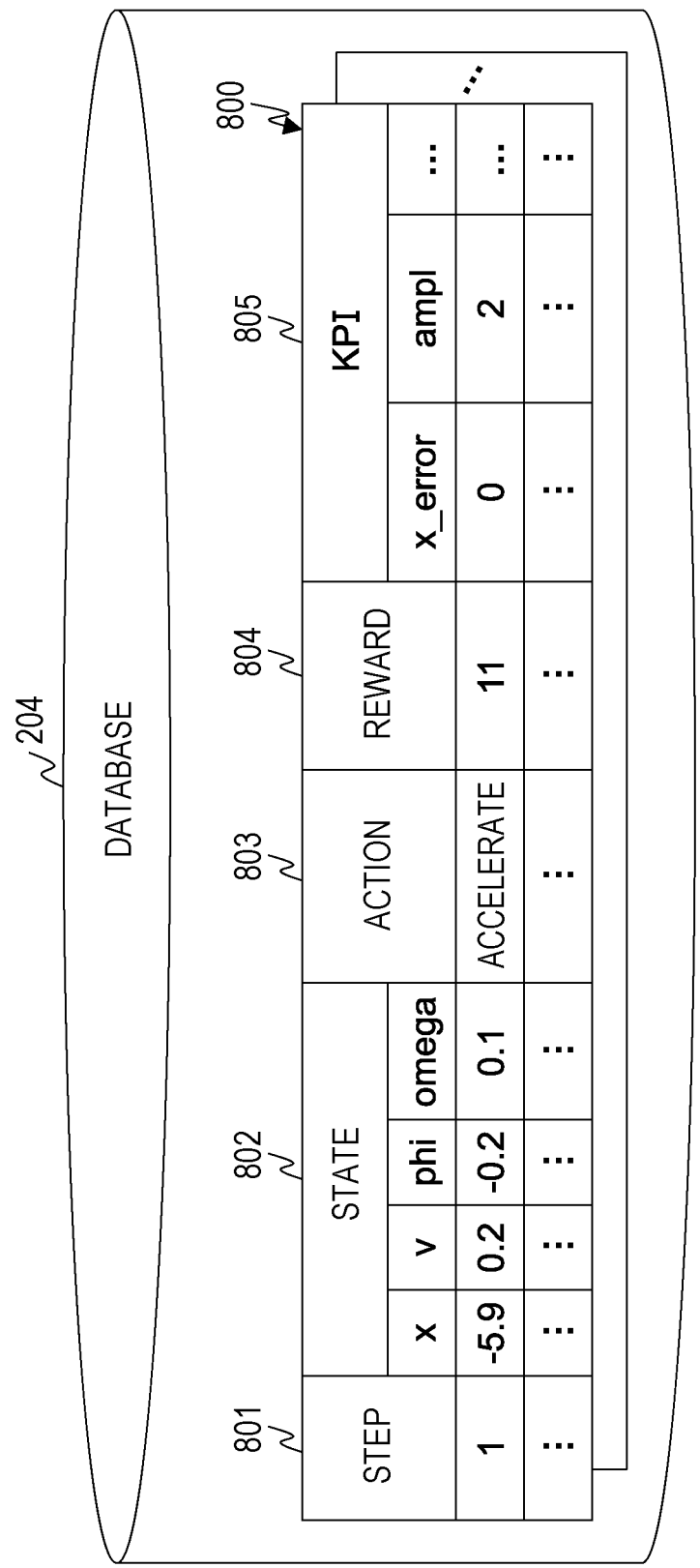
FIG. 8 is a diagram illustrating an example of a data structure of a database of the first embodiment.

FIG. 8 is a diagram illustrating an example of a data structure of the database 204 of the first embodiment.

The database 204 includes a plurality of learning result tables 800 each indicating execution results of the reinforcement learning on a one episode basis. The order of the episode is given to the learning result table 800.

The learning result table 800 includes a plurality of entries each including a step 801, a state 802, an action 803, a reward 804, and a KPI 805. There are as many entries in the learning result table 800 as the number of interactions (steps) performed in one episode.

The step 801 is a field that stores an identification number of the step. The identification number set in the step 801 matches the execution order of the interaction corresponding to the entry. The state 802 is a field that stores values indicating the state of the environment. The action 803 is a field that stores information indicating an action performed under the state of the environment corresponding to the state 802. The reward 804 is a field that stores a reward obtained when the action for the action 803 is performed under the state of the environment corresponding to the state 802. The KPI 805 is a field group that stores a KPI after the action is taken.

The problem adjustment unit 202 generates the learning result table 800 corresponding to an episode to be executed before execution of the learning processing. After the processing of one step is executed, the problem adjustment unit 202 adds an entry to the generated learning result table 800, and sets an identification number of the executed step in the step 801 of the added entry.

The problem adjustment unit 202 sets a value of the state acquired from the environment execution unit 203 in the state 802 of the added entry, and sets a value of the action acquired from the reinforcement learning execution unit 201 in the action 803 of the entry. The problem adjustment unit 202 calculates a reward on the basis of the reward function, and sets the calculated reward in the reward 804 of the added entry. In addition, the problem adjustment unit 202 calculates a KPI, and sets the calculated KPI in the KPI 805 of the added entry. Note that, the KPI may be calculated by the environment execution unit 203 or the like.

Figure 9:
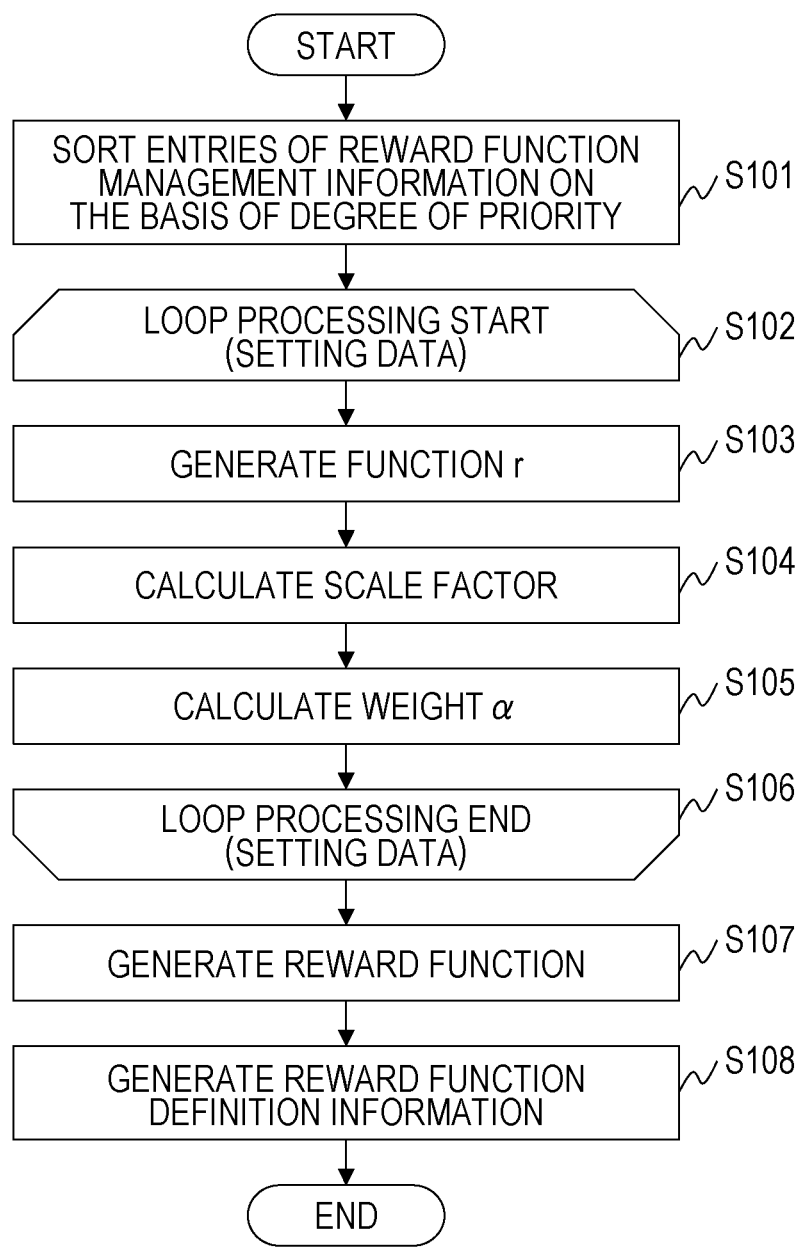
FIG. 9 is a flowchart illustrating an example of reward function generation processing executed by a reward function generation unit of the first embodiment.

FIG. 9 is a flowchart illustrating an example of reward function generation processing executed by the reward function generation unit 212 of the first embodiment.

When accepting input of the reward function management information 215, the reward function generation unit 212 starts processing described below.

The reward function generation unit 212 sorts the entries of the reward function management information 215 on the basis of a value of the degree of priority 506 (step S101). Here, the reward function generation unit 212 sorts the entries in descending order of the order of priority.

Next, the reward function generation unit 212 starts loop processing of the setting data (step S102).

Specifically, the reward function generation unit 212 selects one entry (setting data) in descending order of the order of priority, that is, in order from the top of the reward function management information 215.

Next, the reward function generation unit 212 generates the function r on the basis of the selected entry and the function definition information 216 (step S103). Specifically, the following processing is executed.

The reward function generation unit 212 refers to the function definition information 216, and searches for an entry in which a combination of values of the condition 601 and the purpose 602 matches a combination of values of the condition 503 and the purpose 504 of the selected entry.

The reward function generation unit 212 acquires definition information on a function stored in the function type 603 of the retrieved entry. The reward function generation unit 212 generates the function r on the basis of the definition information on the KPI and the definition information of the function. The above is the description of the processing of step S102.

Next, on the basis of a value of the degree of priority 506 of the selected entry, the reward function generation unit 212 calculates a scale factor that defines the magnitude of a value calculated by using the partial reward function (step S104).

In the first embodiment, the scale is adjusted so that a large reward is calculated from a partial reward function generated on the basis of setting data to which high order of priority is set. For example, the scale factor of the partial reward function with the degree of priority 506 of "1" is calculated as $10^6$, and the scale factor of the partial reward function with the degree of priority 506 of "2" is calculated as $10^5$.

The reward function generation unit 212 sets a function obtained by multiplying the function r by the scale factor in the function 508 of the selected entry.

Next, the reward function generation unit 212 calculates the weight α on the basis of the definition information on the KPI (step S105).

For example, for a domain of the KPI as indicated in formula (2), the weight α is calculated as in formula (3).

[Formula 2]

$$0 < x\_diff < 10 \quad (2)$$

[Formula 3]

$$\alpha = 10 - x\_diff \quad (3)$$

The reward function generation unit 212 sets the calculated weight in the weight 509 of the selected entry. Note that, the reward function generation unit 212 may calculate the weight α on the basis of the definition information on the KPI and the scale factor. In addition, the weight α may be calculated including a range of a value set as a constraint besides the KPI domain.

Next, the reward function generation unit 212 determines whether the processing is completed for all the setting data (step S106).

When it is determined that the processing is not completed for all the setting data, the reward function generation unit 212 returns to step S102 and executes similar processing.

When it is determined that the processing is completed for all the setting data, the reward function generation unit 212 generates a reward function (step S107), and generates the reward function definition information 304 including information regarding the reward function (step S108). The reward function generation unit 212 transmits the reward function definition information 304 to the reinforcement learning execution server 100, and ends the reward function generation processing.

Specifically, the reward function generation unit 212 generates the reward function as a linear combination of partial reward functions obtained by multiplying the function 508 by the weight 509.

Figure 10:
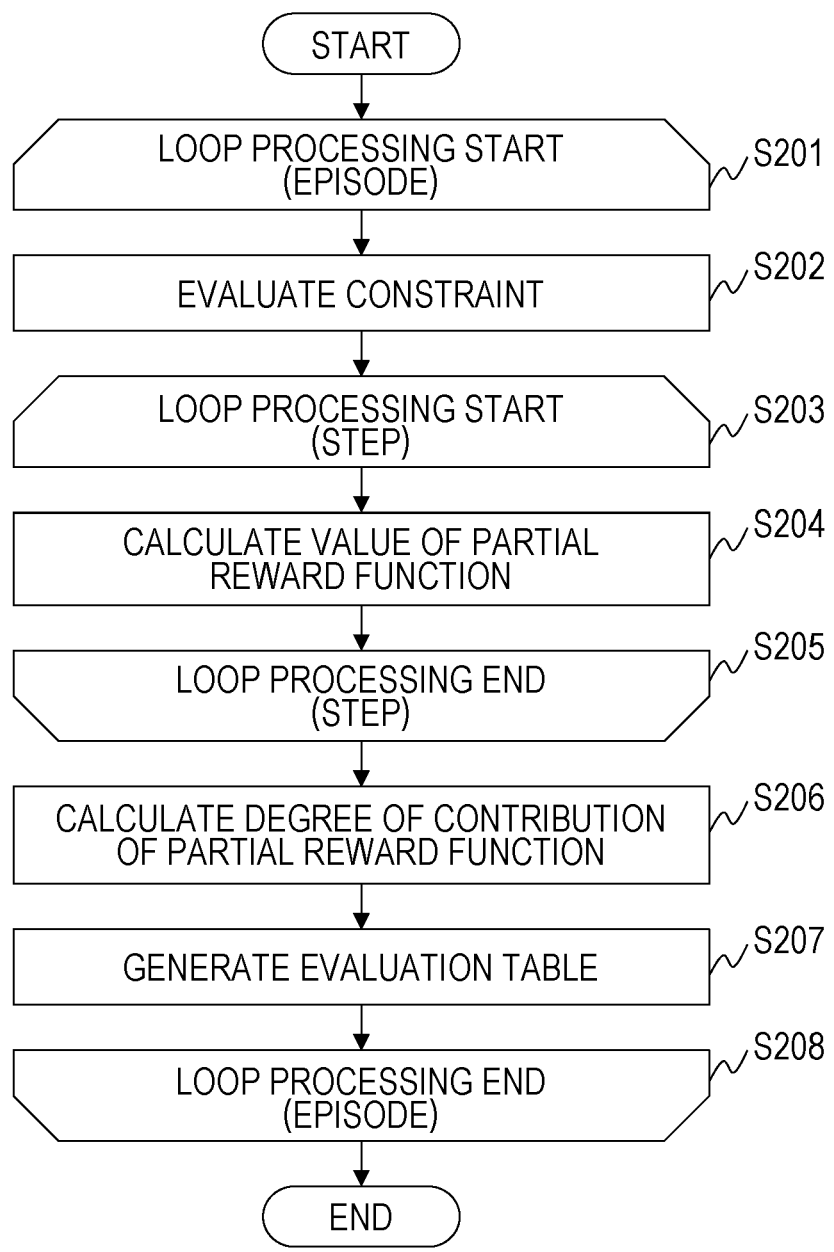
FIG. 10 is a flowchart illustrating an example of evaluation processing executed by a reinforcement learning evaluation unit of the first embodiment.

FIG. 10 is a flowchart illustrating an example of the evaluation processing executed by the reinforcement learning evaluation unit 213 of the first embodiment.

When receiving the processing end notification from the reinforcement learning execution unit 201, the reinforcement learning evaluation unit 213 starts processing described below.

The reinforcement learning evaluation unit 213 starts loop processing of the episode (step S201).

Specifically, the reinforcement learning evaluation unit 213 accesses the database 204 and acquires one of the learning result tables 800. At this time, the reinforcement learning evaluation unit 213 acquires the reward function management information 215. Note that, the reinforcement learning evaluation unit 213 acquires the learning result tables 800 in the execution order of the episodes.

Next, on the basis of the learning result table 800, the reinforcement learning evaluation unit 213 performs evaluation regarding the constraint set for the KPI (step S202). Specifically, the following processing is executed.

The reinforcement learning evaluation unit 213 refers to the KPI 805 of the last entry of the learning result table 800 and an entry related to the constraint of the reward function management information 215, and determines whether the constraint is satisfied. When there are multiple constraints, a determination is made for each constraint.

When it is determined that the constraint is satisfied, the reinforcement learning evaluation unit 213 temporarily stores, in the work area, information that identifies the constraint and an evaluation result "true" in association with each other. When it is determined that the constraint is not satisfied, the reinforcement learning evaluation unit 213 temporarily stores, in the work area, the information that identifies the constraint and an evaluation result "false" in association with each other. The above is the description of the processing of step S202.

Next, the reinforcement learning evaluation unit 213 starts loop processing of the step (step S203).

Specifically, the reinforcement learning evaluation unit 213 selects one of the entries from the learning result table 800. Note that, the entries are selected in the order of the step.

Next, the reinforcement learning evaluation unit 213 calculates a value of the partial reward function in a step corresponding to the selected entry (step S204).

Specifically, the reinforcement learning evaluation unit 213 calculates a value of each partial reward function on the basis of the state 802, the action 803, and the KPI 805 of the entry corresponding to the selected step, and the reward function management information 215. At this time, the reinforcement learning evaluation unit 213 generates a table in which the identification number of the step, the ID 501, and the value of the partial reward function are associated with each other, and temporarily stores the table in the work area.

Next, the reinforcement learning evaluation unit 213 determines whether the processing is completed for all the steps (step S205).

When it is determined that the processing is not completed for all the steps, the reinforcement learning evaluation unit 213 returns to step S203 and executes similar processing.

When it is determined that the processing is completed for all the steps, the reinforcement learning evaluation unit 213 calculates a degree of contribution of each partial reward function (step S206). Specifically, the following processing is executed.

The reinforcement learning evaluation unit 213 selects a target partial reward function, and multiplies the value of the target partial reward function of each step from the table generated in step S204 by an attenuation coefficient from the end of the episode.

The reinforcement learning evaluation unit 213 sums up the values of the respective steps, thereby calculating an expected value of the target partial reward function. The reinforcement learning evaluation unit 213 calculates the degree of contribution of the partial reward function on the basis of the expected value of each partial reward function. For example, a ratio of the expected value is calculated as the degree of contribution.

Note that, the calculation method of the degree of contribution described above is an example, and is not limited thereto. The above is the description of the processing of step S206.

Next, the reinforcement learning evaluation unit 213 generates the evaluation table 700 corresponding to the selected episode (step S207). Specifically, the following processing is executed.

The reinforcement learning evaluation unit 213 selects an entry from the reward function management information 215. The reinforcement learning evaluation unit 213 adds an entry to the evaluation table 700, and for the added entry, sets values of the KPI name 502, the condition 503, and the purpose 504 of the selected entry in the KPI name 701, the condition 702, and the purpose 703.

When the selected entry is the entry related to the constraint, the reinforcement learning evaluation unit 213 sets the evaluation result stored in the work area in the evaluation 705 of the added entry. The reinforcement learning evaluation unit 213 sets the degree of contribution of a partial reward function corresponding to the selected entry in the degree of contribution 706 of the added entry.

The reinforcement learning evaluation unit 213 executes similar processing for all the entries of the reward function management information 215. The above is the description of the processing of step S207.

Next, the reinforcement learning evaluation unit 213 determines whether the processing is completed for all the episodes (step S208).

When it is determined that the processing is not completed for all the episodes, the reinforcement learning evaluation unit 213 returns to step S201 and executes similar processing.

When it is determined that the processing is completed for all the episodes, the reinforcement learning evaluation unit 213 ends the evaluation processing. At this time, the reinforcement learning evaluation unit 213 outputs the reinforcement learning evaluation information 217 including the plurality of evaluation tables 700 to the reward function generation unit 212 and the result output unit 214.

Figure 11:
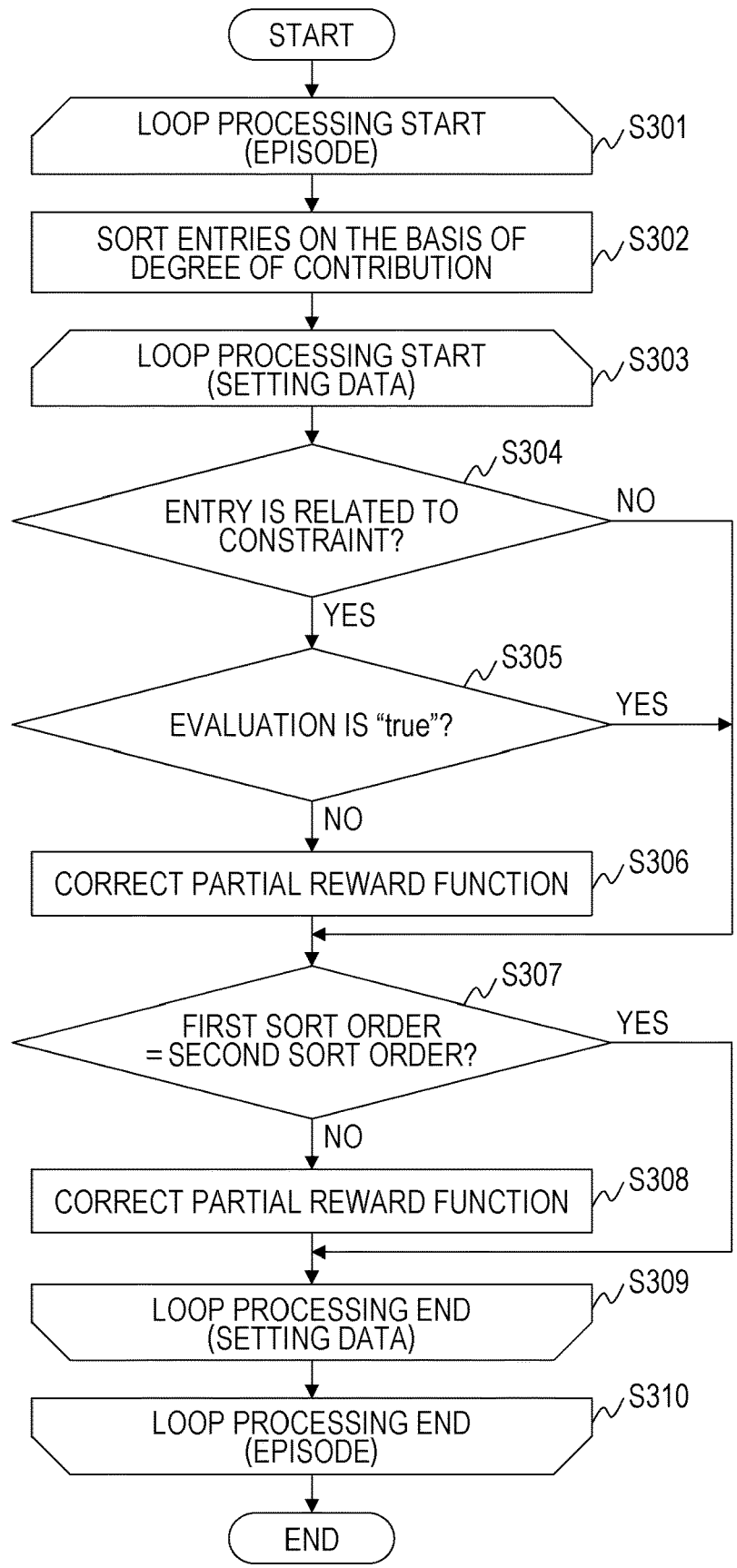
FIG. 11 is a flowchart illustrating an example of reward function correction processing executed by the reward function generation unit of the first embodiment.

FIG. 11 is a flowchart illustrating an example of reward function correction processing executed by the reward function generation unit 212 of the first embodiment.

When accepting the reinforcement learning evaluation information 217, the reward function generation unit 212 starts processing described below.

The reward function generation unit 212 starts loop processing of the episode (step S301).

Specifically, the reward function generation unit 212 acquires one of the evaluation tables 700 from the reinforcement learning evaluation information 217. Note that, the reward function generation unit 212 acquires the evaluation tables 700 in the execution order of the episodes.

Next, the reward function generation unit 212 sorts the entries of the evaluation table 700 on the basis of the magnitude of a value of the degree of contribution 706 (step S302). Here, the entries are sorted in descending order of the degree of contribution. At this time, the reward function generation unit 212 manages, as a first sort order, the order of each entry (each partial reward function) when the entries are sorted on the basis of the order of priority, and manages, as a second sort order, the order of each entry (each partial reward function) when the entries are sorted on the basis of the degree of contribution.

Next, the reward function generation unit 212 starts loop processing of the setting data (step S303).

Specifically, the reward function generation unit 212 selects one entry in order from the top of the evaluation table 700.

Next, the reward function generation unit 212 determines whether the selected entry is an entry related to the constraint (step S304).

Specifically, the reward function generation unit 212 determines whether a value is set in the evaluation 705 of the selected entry. When the value is set in the evaluation 705 of the selected entry, the reward function generation unit 212 determines that the selected entry is the entry related to the constraint.

When it is determined that the selected entry is not the entry related to the constraint, the reward function generation unit 212 proceeds to step S307.

When it is determined that the selected entry is the entry related to the constraint, the reward function generation unit 212 determines whether the value set in the evaluation 705 of the entry is "true" (step S305).

When it is determined that the value set in the evaluation 705 of the selected entry is "true", the reward function generation unit 212 proceeds to step S307.

When it is determined that the value set in the evaluation 705 of the selected entry is not "true", the reward function generation unit 212 corrects a partial reward function corresponding to the selected entry (step S306). Thereafter, the reward function generation unit 212 proceeds to step S307. Specifically, the following processing is executed.

The reward function generation unit 212 refers to the reward function management information 215, and searches for an entry in which a combination of values of the KPI name 502, the condition 503, and the purpose 504 matches a combination of values of the KPI name 701, the condition 702, and the purpose 703 of the selected entry.

The reward function generation unit 212 corrects the partial reward function in accordance with a value set in the correction method 507 of the retrieved entry. For example, when "1" is set in the correction method 507, the reward function generation unit 212 refers to the function definition information 216, and searches for an entry in which a combination of values of the condition 601 and the purpose 602 matches a combination of values of the condition 702 and the purpose 703 of the selected entry. The reward function generation unit 212 generates a sum of an original function and a penalty term as a new function r on the basis of the penalty function type 604 of the retrieved entry and the definition information on the KPI. Note that, the weight may be corrected along with the correction of the function r.

The reward function generation unit 212 sets the corrected partial reward function in the function 508 of the entry retrieved from the reward function management information 215. The above is the description of the processing of step S306.

In step S307, the reward function generation unit 212 determines whether the first sort order and the second sort order match each other for the selected entry (step S307).

For example, when the first sort order is "3" that is a sort result based on a value of the degree of priority 506 and the second sort order is "4" that is a sort result based on a value of the degree of contribution 706, the reward function generation unit 212 determines that the first sort order and the second sort order do not match each other.

In the first embodiment, on the basis of the value of the degree of priority 506, the scale factor is calculated so that the two sort orders match each other. However, when inconsistency occurs in the sort orders based on the degree of priority 506 and the degree of contribution 706, it means that setting of the reward is not appropriate. For that reason, when occurrence of such inconsistency is detected, the reward function generation unit 212 corrects the partial reward function.

When it is determined that the first sort order and the second sort order match each other, the reward function generation unit 212 proceeds to step S309.

When it is determined that the first sort order and the second sort order do not match each other, the reward function generation unit 212 corrects the partial reward function so that the inconsistency can be eliminated (step S308). Thereafter, the reward function generation unit 212 proceeds to step S309.

Specifically, the reward function generation unit 212 updates the weight α on the basis of a relationship of the degree of contribution of another partial reward function. The reward function generation unit 212 sets the updated weight α in the weight 509 of the entry retrieved from the reward function management information 215.

In step S309, the reward function generation unit 212 determines whether the processing is completed of all the setting data set in the selected evaluation table 700 (step S309).

When it is determined that the processing is not completed of all the setting data set in the selected evaluation table 700, the reward function generation unit 212 returns to step S303 and executes similar processing.

When it is determined that the processing is completed of all the setting data set in the selected evaluation table 700, the reward function generation unit 212 determines whether the processing is completed for all the episodes (step S310). That is, the reward function generation unit 212 determines whether the processing is completed of all the evaluation tables 700 included in the reinforcement learning evaluation information 217.

When it is determined that the processing is not completed for all the episodes, the reward function generation unit 212 returns to step S301 and executes similar processing.

When it is determined that the processing is completed for all the episodes, the reward function generation unit 212 ends the reward function correction processing.

As described above, the system described in the first embodiment automatically generates the reward function on the basis of the information regarding the KPI. As a result, the burden of reward design can be reduced. Costs can therefore be reduced required for reinforcement learning, such as processing time and operation costs. In addition, the system corrects the reward function on the basis of the result of the reinforcement learning. As a result, more appropriate learning can be performed, and an optimal measure can be acquired.

Note that, the present invention is not limited to the embodiment described above, and includes various modifications. For example, the embodiment described above has been described in detail for describing configurations of the present invention clearly, and is not necessarily limited to that including all the configurations described. A part of the configuration of the embodiment can be added to, removed from, and replaced with another configuration.

In addition, each of the configurations, functions, processing units, processing devices, and the like described above may be implemented by hardware, for example, by designing part or all of them with an integrated circuit. The present invention can also be implemented by a program code of software for implementing a function of the embodiment. In that case, a storage medium recording the program code is provided to a computer, and a CPU provided in the computer reads the program code stored in the storage medium. In that case, the program code itself read from the storage medium implements the function of the embodiment described above, and the program code itself and the storage medium storing the program code configure the present invention. Examples of the storage medium used for providing such a program code include, for example, a flexible disk, CD-ROM, DVD-ROM, hard disk, solid state drive (SSD), optical disk, magneto optical disk, CD-R, magnetic tape, nonvolatile memory card, and ROM.

In addition, the program code that implements the function described in the present embodiment can be installed by a wide range of programs or script languages such as assembler, C/C++, perl, Shell, PHP, Python, and Java.

Further, the program code of the software for implementing the function of the embodiment may be stored in a storage unit such as the hard disk or memory of the computer, or in the storage medium such as the CD-R or CD-RW, by being distributed via a network, and the CPU of the computer may read and execute the program code stored in the storage unit or the storage medium.

In the embodiment described above, control lines and information lines indicated are considered to be necessary on the description, and do not necessarily indicate all the control lines and information lines on products. All configurations may be connected to each other.

What is claimed is:

1. A reward function generation method for calculating a reward in reinforcement learning, the reward function generation method being executed by a computer, the computer including a processor, a memory connected to the processor, and a network interface connected to the processor, the reward function generation method comprising:

a first step of accepting input of an instruction to generate a reward function, by the processor, wherein the instruction to generate the reward function includes:

a plurality of setting data comprising information regarding a key performance indicator, a control purpose of the key performance indicator, and a timing of calculating a reward regarding the key performance indicator, wherein the memory stores function definition information in which a combination of the control purpose of the key performance indicator and the timing of calculating the reward are associated with a type of a specific function, and definition information on the key performance indicator;

a second step of generating one partial reward function for one of the plurality of setting data and storing the one partial reward function in the memory, by the processor, wherein the second step includes:

selecting target setting data from the plurality of setting data, referring to the function definition information based on the combination of the control purpose of the key performance indicator and the timing of calculating the reward included in the target setting data, and identifying the type of the specific function to be generated, and generating the specific function having a parameter related to the key performance indicator as a variable based on the identified type of the specific function and the definition information on the key performance indicator; and a third step of generating a linear combination of a plurality of partial reward functions as the reward function and storing the linear combination in the memory, by the processor; and a fourth step of outputting information regarding the generated reward function to a computer that executes the reinforcement learning, by the processor.

2. The reward function generation method according to claim 1, wherein the plurality of setting data further comprises a degree of priority indicating order of priority of the control purpose of the key performance indicator, and the second step further includes:

calculating a scale factor that defines a magnitude of a value calculated by using the specific function based on a degree of priority included in the target setting data, by the processor;

calculating a weight based on a domain of the key performance indicator included in the target setting data, by the processor; and generating the one partial reward function based on the specific function, the scale factor, and the weight, by the processor.

3. The reward function generation method according to claim 2, further comprising:

a fifth step of acquiring a result of the reinforcement learning using the generated reward function, and generating an evaluation result by evaluating the result of the reinforcement learning, by the processor;

a sixth step of identifying a partial reward function to be corrected based on the evaluation result, and correcting the identified partial reward function, by the processor; and a seventh step of updating the reward function based on a correction result of the identified partial reward function, by the processor.

4. The reward function generation method according to claim 3, wherein the control purpose of the key performance indicator includes a constraint to be satisfied by the key performance indicator, the reward function includes a first partial reward function generated based on the plurality of setting data including a first constraint as the control purpose of the key performance indicator, and the sixth step includes identifying the first partial reward function as the partial reward function to be corrected, by the processor, when the first constraint is not satisfied.

5. The reward function generation method according to claim 3, wherein the one partial reward function is managed in association with the plurality of setting data, the fifth step includes calculating a degree of contribution indicating a magnitude of contribution of a value obtained from each of the plurality of partial reward functions to selection of an action in the reinforcement learning, by the processor, and the sixth step includes:

comparing a first sort order that is an order in which the plurality of partial reward functions are sorted based on a degree of priority included in the plurality of setting data corresponding to the one partial reward function with a second sort order that is an order in which the partial reward functions are sorted based on the degree of contribution, by the processor; and identifying a partial reward function of which the first sort order and the second sort order are different from each other, as the partial reward function to be corrected, by the processor.

6. The reward function generation method according to claim 3, further comprising providing an interface for setting the plurality of setting data and a correction method of the partial reward function to be corrected, by the processor.

7. A computer system comprising a plurality of computers, the plurality of computers each including a processor, a memory connected to the processor, and a network interface connected to the processor, the computer system including a learning unit that executes reinforcement learning, and a reward function generation unit that generates a reward function for calculating a reward in the reinforcement learning, wherein the reward function generation unit, generates one partial reward function for one of the plurality of setting data when accepting input of an instruction to generate the reward function, wherein the instruction to generate the reward function includes:

a plurality of setting data comprising information regarding a key performance indicator, a control purpose of the key performance indicator, and a timing of calculating a reward regarding the key performance indicator, and definition information on the key performance indicator;

manages function definition information in which a combination of the control purpose of the key performance indicator and the timing of calculating the reward are associated with a type of a specific function;

generates a linear combination of a plurality of partial reward functions as the reward function;

selects target setting data from the plurality of setting data included in the instruction to generate the reward function;

refers to the function definition information based on the combination of the control purpose of the key performance indicator and the timing of calculating the reward included in the target setting data, and identifies the type of the specific function to be generated;

generates a specific function having a parameter related to the key performance indicator as a variable based on the identified type of the specific function and the definition information on the key performance indicator; and outputs, to the learning unit, information regarding the generated reward function.

8. The computer system according to claim 7, wherein the plurality of setting data further comprises a degree of priority indicating order of priority of the control purpose of the key performance indicator, and the reward function generation unit calculates a scale factor that defines a magnitude of a value calculated by using the specific function based on a degree of priority included in the target setting data, calculates a weight based on a domain of the key performance indicator included in the target setting data, and generates the one partial reward function based on the specific function, the scale factor, and the weight.

9. The computer system according to claim 8, wherein the learning unit executes the reinforcement learning by using the reward function generated, and transmits, to the reward function generation unit, a result of the reinforcement learning by using the reward function generated, and the reward function generation unit evaluates the result of the reinforcement learning by using the reward function generated, identifies a partial reward function to be corrected based on a result of the evaluation, and corrects the identified partial reward function, and updates the reward function based on the basis of a correction result of the identified partial reward function.

10. The computer system according to claim 9, wherein the control purpose of the key performance indicator includes a constraint to be satisfied by the key performance indicator, the reward function includes a first partial reward function generated based on the plurality of setting data including a first constraint as the control purpose of the key performance indicator, and the reward function generation unit identifies the first partial reward function as the partial reward function to be corrected when the first constraint is not satisfied.

11. The computer system according to claim 9, wherein the one partial reward function is managed in association with the plurality of setting data, and the reward function generation unit calculates a degree of contribution indicating a magnitude of contribution of a value obtained from each of the plurality of partial reward functions to selection of an action in the reinforcement learning, compares a first sort order that is an order in which the plurality of partial reward functions are sorted based on a degree of priority included in the plurality of setting data corresponding to the one partial reward function with a second sort order that is an order in which the plurality of partial reward functions are sorted based on the degree of contribution, and identifies a partial reward function of which the first sort order and the second sort order are different from each other, as the partial reward function to be corrected.

12. The computer system according to claim 9, wherein the reward function generation unit provides an interface for setting the plurality of setting data and a correction method of the partial reward function to be corrected.

* * * * *